United States Patent
Zhao

(10) Patent No.: US 10,131,795 B2
(45) Date of Patent: Nov. 20, 2018

(54) PROJECTION SCREEN AND PROJECTION DISPLAY SYSTEM

(71) Applicant: Hisense Co., Ltd., Qingdao (CN)

(72) Inventor: Fei Zhao, Qingdao (CN)

(73) Assignees: Hisense Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 15/584,630

(22) Filed: May 2, 2017

(65) Prior Publication Data

US 2017/0233582 A1   Aug. 17, 2017

(30) Foreign Application Priority Data

Oct. 31, 2016   (CN) .......................... 2016 1 0971448

(51) Int. Cl.
| | |
|---|---|
| *G03B 21/10* | (2006.01) |
| *C09D 5/00* | (2006.01) |
| *G03B 21/28* | (2006.01) |
| *G03B 21/56* | (2006.01) |

(Continued)

(52) U.S. Cl.
CPC ............. *C09D 5/006* (2013.01); *G03B 21/10* (2013.01); *G03B 21/28* (2013.01); *G02B 3/08* (2013.01); *G03B 21/2053* (2013.01); *G03B 21/56* (2013.01)

(58) Field of Classification Search
CPC ........ G03B 21/10; G03B 21/28; G03B 21/56; G03B 21/60; H04N 13/0404; H04N 13/0409; H04N 13/0443; G02B 27/10; G02B 27/0101; G02B 27/144; G02B 27/2214

See application file for complete search history.

(56) References Cited

U.S. PATENT DOCUMENTS

| | | | |
|---|---|---|---|
| 2005/0030620 A1* | 2/2005 | Goto ...................... | G02B 3/005 359/460 |
| 2006/0109569 A1* | 5/2006 | Ogawa .................... | G02B 3/08 359/742 |

(Continued)

FOREIGN PATENT DOCUMENTS

| | | |
|---|---|---|
| CN | 1095204 | 11/1994 |
| CN | 1158170 | 8/1997 |
| CN | 203386430 | 1/2014 |

(Continued)

OTHER PUBLICATIONS

Office Action from corresponding Chinese Application No. 201610971448.7 dated Jan. 2, 2018 (7 pages).

*Primary Examiner* — Sultan Chowdhury
(74) *Attorney, Agent, or Firm* — Harness, Dickey & Pierce, P.L.C.

(57) ABSTRACT

This disclosure relates to the field of projection display technology, and particularly to a projection screen and a projection display system so as to improve the uniformity of brightness throughout the projection screen. There is an anti-reflection coating arranged in a target area on a light incidence side surface of the projection screen to increase transmittivity in the target area, where the target area refers to an area where an incidence angle of projected light beams on the projection screen is above an angle threshold, and the projected light beams are light beams emitted by a projector.

15 Claims, 4 Drawing Sheets

(51) Int. Cl.
    *G03B 21/20*    (2006.01)
    *G02B 3/08*     (2006.01)

(56)             References Cited

U.S. PATENT DOCUMENTS

2006/0227433 A1*  10/2006  Suzuki ................... G02B 3/08
                                                          359/742
2010/0188745 A1*  7/2010   Endo ..................... G03B 21/60
                                                          359/457

FOREIGN PATENT DOCUMENTS

JP        H10160906      6/1998
JP        2003215310     7/2003

* cited by examiner

PROJECTION SCREEN AND PROJECTION DISPLAY SYSTEM

CROSS-REFERENCE TO RELATED APPLICATION

This application claims the benefit and priority of Chinese Patent Application No. 201610971448.7 filed Oct. 31, 2016. The entire disclosure of the above application is incorporated herein by reference.

FIELD

This disclosure relates to the field of projection display technologies, and particularly to a projection screen and a projection display system.

BACKGROUND

This section provides background information related to the present disclosure which is not necessarily prior art.

In the field of projection displays, projection display systems are categorized into a rear projection display system and a front projection display system, where the rear projection display system includes a projector and a rear-projection screen, and the front-projection display system includes a projector and a front-projection screen.

As illustrated in FIG. 1(a), there is a schematic diagram of the rear-projection display system in the relevant art, where the rear projection screen is a Fresnel lens screen, and the Fresnel lens screen refers to an optical screen including a Fresnel lens layer configured to converge and collimate light incident of the projector into parallel emergent light transmitted to an optical lens layer located after the Fresnel lens layer; and as illustrated in FIG. 1(a), all the light leaving the Fresnel lens is transmitted to a column lens layer in the horizontal direction, and convex lens components in the column lens layer receive and converge the collimated light rays, and image them onto the focal plane of the convex lenses, so that the light rays which are converged and then diverged exit from the column lens layer, thus entering human eyes.

SUMMARY

This section provides a general summary of the disclosure, and is not a comprehensive disclosure of its full scope or all of its features.

In a first aspect, some embodiments of this disclosure provide a projection screen including an anti-reflection coating arranged in a target area on a light incidence side surface of the projection screen to increase transmittivity in the target area, wherein the target area refers to an area where an incidence angle of projected light beams on the projection screen is above an angle threshold, and the projected light beams are light beams emitted by a projector.

In a second aspect, some embodiments of this disclosure further provide a projection display system including the projection screen according to the first aspect above, and a projector.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 1A:
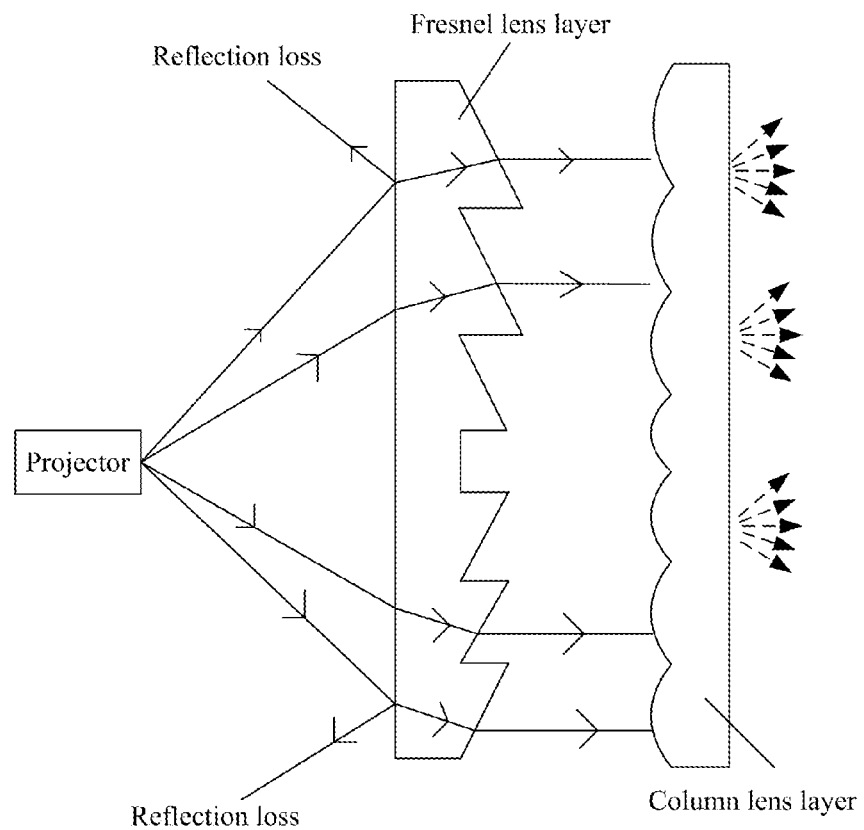
FIG. 1(a) is a schematic diagram of a rear projection display system in the relevant art.

Projection display systems are categorized into a rear projection display system and a front projection display system, where in the rear projection display system, human eyes and a projector are located respectively on two sides of a projection screen, that is, the projector projects light onto the projection screen, and then the light is refracted by the projection screen, and then transmitted to the human eyes; and in the rear projection display system, the projection screen is referred to as a rear projection screen. An optical test on the rear projection screen using Fresnel lenses in the field of rear projection displays shows that even if there is good uniformity of the brightness of the light emitted by the projector itself, then the uniformity of the brightness of the light passing the rear projection screen may be altered because the screen itself may vary the brightness of light beams, and the brightness really perceived by the human eyes is the brightness of such light beams emitted by the projector that are affected by the screen. The inventor finds that, in the structure of the rear projection screen as illustrated in FIG. 1(a), light rays emitted by the projector may be reflected on the surface of the Fresnel lenses layer while passing the Fresnel lenses layer, thus resulting in a loss of energy, moreover the loss of energy increases with an increasing angle of the incident light. For example, given the projector with a projection ratio ranging from 0.6 to 0.7, a loss of energy on the edge of the rear projection screen is typically higher than that at the center thereof by a factor of approximately 20%, and the shorter a focus distance of the projector is (i.e., the larger an angle of the incident light rays), the higher a loss of energy on the edge of the rear projection screen is than that at the center thereof that may degrade the uniformity of brightness throughout the rear projection screen.

Figure 1B:
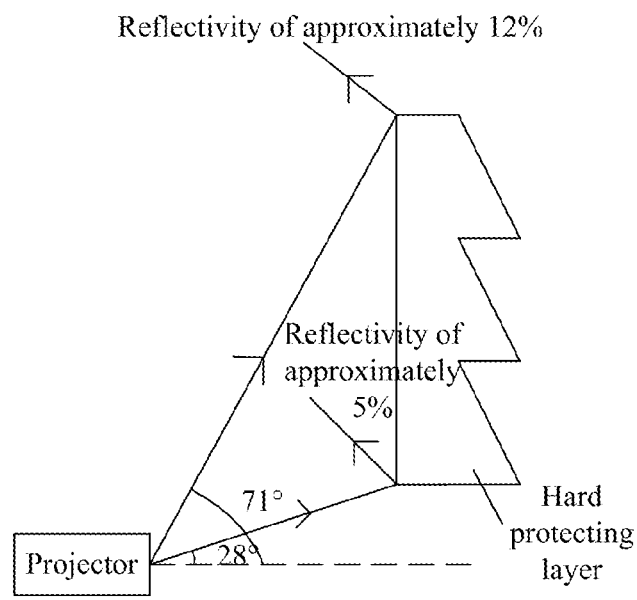
FIG. 1(b) is a schematic diagram of a front projection display system in the relevant art.

In some embodiments of this disclosure, in the front projection display system, the projection screen is a front projection screen, where the front projection screen includes a hardened layer, a diffusing layer, a Fresnel lens layer, and a reflecting layer in that order in the incidence direction of light rays from the projector. The light rays, emitted by the projector, passing the surface of the front projection screen is refracted mostly into the screen, then is focused by the Fresnel lenses and reflected by the reflecting layer, and further leaves the screen, thus entering the human eyes. Common front projection display systems include a desktop front projection display system and a suspending front projection display system, where in the desktop front projection display system, the central axis of a projector is lower than the central axis of a projection screen; and in the suspending front projection display system, the central axis of a projector is higher than the central axis of a projection system. Alike the front projection display system also suffers from the problem of non-uniformity of light projected onto the screen. As illustrated in FIG. 1(b), there is a schematic diagram of the front projection display system in the relevant art, where the desktop front projection display system is presented, that is, the projector is placed on a desktop, the position of the center of the front projection screen is higher than the position of the center of the projector, and the human eyes and the projector are located on the same side of the front projection screen; and at this time, the emergent light of the projector is irradiated onto the front-projection screen, firstly onto a planar hard protecting layer of the front projection screen, where the light rays, emitted by the projector, passing the surface of the front projection screen (i.e., the hard protecting layer) is refracted mostly into the front projection screen, then is focused by the Fresnel lenses on the other side of the hard protecting layer, and reflected by the reflecting layer, further leaves the front projection screen in the horizontal direction. Approximately 10% to 20% of the light rays being incident on the front-projection screen are reflected on the surface of the front projection screen, thus resulting in a loss of brightness, and as illustrated in FIG. 1(b), the larger an incidence angle of the light emitted by the projector is (That is, the larger the incident angle of the projected light on the front projection screen), the higher a loss of the reflected light on the surface of the front projection screen is, thus resulting in lower energy of the refracted light entering the front projection screen, and hence poorer uniformity of light on the front projection screen.

In the projection screen according to some embodiments of this disclosure, there is an anti-reflection coating arranged in a target area on the light-incidence side surface of the projection screen to enhance the transmittivity in the target area, where the target area refers to an area where the incidence angle of the projected light beams on the projection screen is above an angle threshold, where the projected light beams are light beams emitted by the projector.

The anti-reflection coating is arranged on the surface of the target area of the projection screen (where the target area is generally an area with a bigger incidence angle of the projected light beams, a bigger incidence angle according to the same incidence surface may cause more loss of light energy), where the anti-reflection coating can be an optical anti-reflection film (i.e., a reflectivity-reducing film). The anti-reflection coating can be arranged to thereby improve the amount of incident light rays and reduce the reflective light rays in the target area so as to reduce the difference in brightness thereof from area other than the target area (generally an area with high brightness), thus improving the uniformity of brightness throughout the entire. The anti-reflection coating can be an optical anti-reflection film, for example, in order to improve an effect of transmitting light throughout the visible range of 380 nm to 760 nm in the target area, the optical anti-reflection film is an anti-reflection film in two or more layers of materials, e.g., Magnesium Fluoride ($MgF_2$), Titania ($TiO_2$), Zinc Selenide (ZnSe), etc., which are plated through vacuum vapor plating, chemical vapor deposition, sol-gel plating, etc.

In the projection screen according to some embodiments of this disclosure, the target area is divided into N sub-target areas in which the anti-reflection coating is arranged so that the transmittivity is increased by a varying factor in the respective sub-target areas, where N is a positive integer.

Since there are also different losses of light energy at different positions in the target area, in the embodiments of this disclosure, when the anti-reflection coating is arranged in the target area, the target area is divided into the N sub-target areas, so that the anti-reflection coating in the N sub-target areas is such that the transmittivity in the N sub-target areas is increased by a varying factor in such a way that if there is a larger incidence angle of the projected light beams projected onto the sub-target areas, then the transmittivity in the sub-target areas will be increased by a larger factor due to the anti-reflection coating in the sub-target areas, so the brightness on the projected screen will be made more uniform; or if there is a shorter distance from the intersection between the horizontal optical axis of the projector and the plane where the projected screen lies, then the transmittivity in the sub-target areas will be increased by a smaller factor due to the anti-reflection coating in the sub-target areas, so the brightness on the screen can vary consecutively in such a way that it decrements gradually from the center to the edge thereof, while improving the uniformity of brightness throughout the screen.

The respective types of projection screens will be described below respectively.

I. The projection screen is a rear projection screen.

Figure 2:
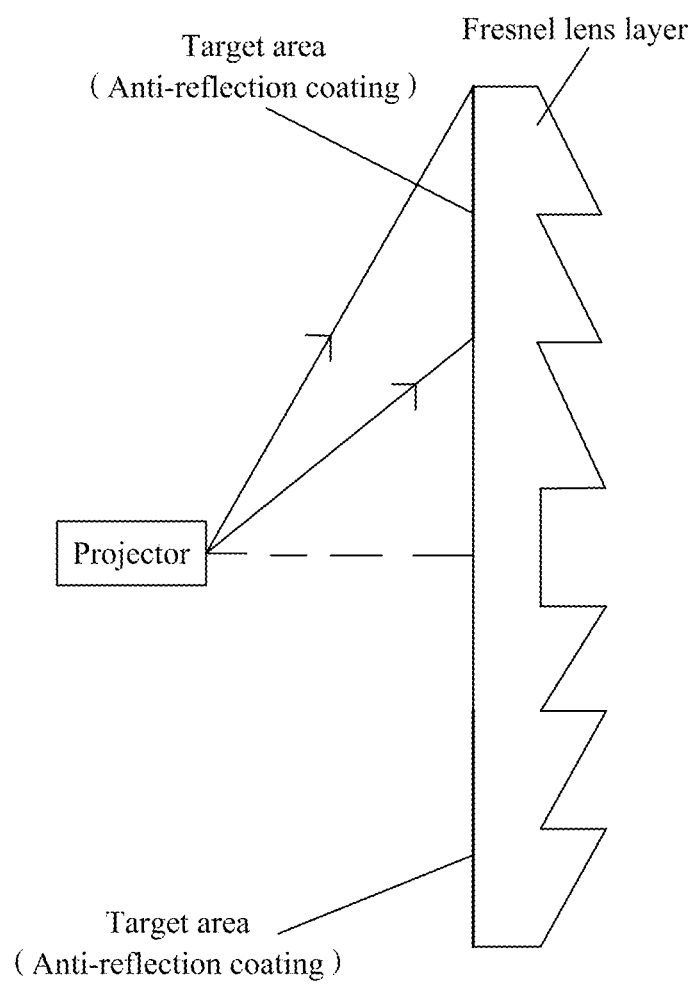
FIG. 2 is a schematic diagram of a rear projection display system according to some embodiments of this disclosure.

As illustrated in FIG. 2, there a schematic diagram of a projection display system according to some embodiments of this disclosure, where a projection screen is a rear projection screen, and the light incidence side surface of the projection screen is a Fresnel lens layer.

In the relevant art, the rear projection display system, since the projector is located on a straight line passing the central area of the rear projection screen, and perpendicular to the rear projection screen, generally the central area of the rear projection screen is brighter, and the edge area thereof is darker, that is, the brightness on the rear projection screen becomes darker and darker gradually from the center to the edge thereof, where the central position on the rear projection screen is the intersection between the horizontal optical axis of the projector and the rear projection screen. So in this disclosure, the target area in the rear projection display system is generally the edge area, that is, the area to be optimized is distributed on the edge of the Fresnel lens layer. The incidence angle of the projected light beams on the edge area is above an angle threshold.

Since the Fresnel lens layer is rectangular, and sized the same as the rear projection screen, in some embodiments of this disclosure, referring to FIG. 2, the target area in the rear projection display system is arranged as area on the Fresnel lens layer other than a circular target area, where the circular target area is a circular area with a center being the center of the Fresnel lens layer, i.e., a circular area with the center of the rear projection screen being a center of a circular, and a diameter being a preset length. The target area is around the circular target area. The target area is around the circular target area. Moreover the areal size of the target area is in inverse proportion to the projection ratio of the projector, and the areal size of the circular target area is in direct proportion to the projection ratio of the projector. Moreover typically there will be a better optimization effect given the projection ratio more than 0.4, and the proportion of the areal size of the target area less than 60%.

By way of an example, given the projector with the projection ratio of 0.68 projecting light onto the 70-inch rear projection screen with an aspect ratio of 16:9, the real test shows that the anti-reflection coating shall be arranged in an area where the incidence angle of the projected light beams ranges from 22.5° to 40° (which is a half-angle) on the Fresnel lenses, and if this area is measured as a range of angles of the light emitted by the projector itself, then it shall be a range of angles from 45° to 80° around the optical axis of the projector being a symmetry axis. In this embodiment, the areal size of the anti-reflection coating (i.e., the areal size of the target area) accounts for approximately 65% of the areal size of the entire rear projection screen.

Figure 3:
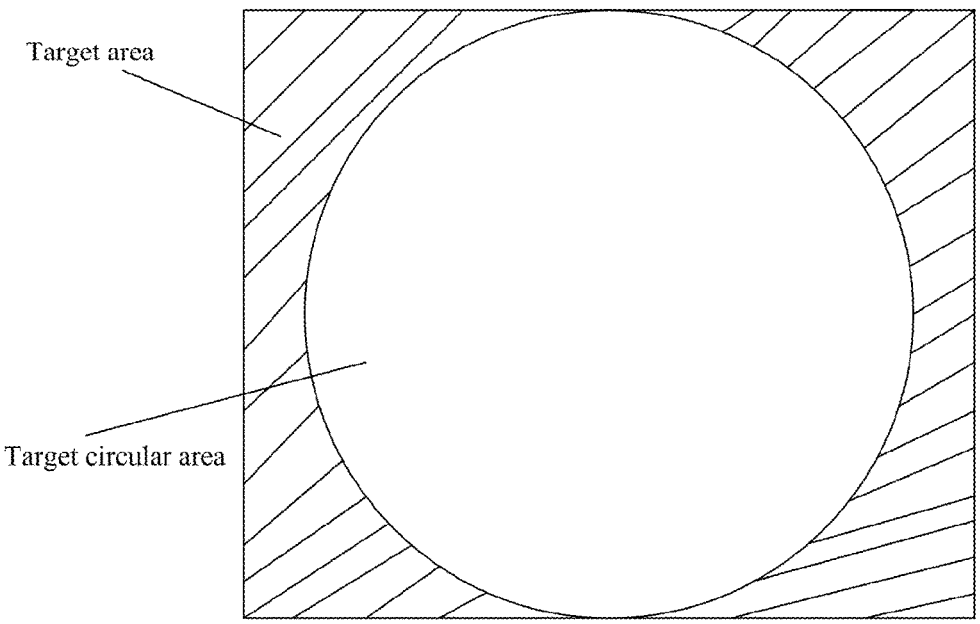
FIG. 3 is a front view of a Fresnel lens layer in a rear projection display system according to some embodiments of this disclosure.

FIG. 3 is a front view of the Fresnel lens layer in the rear projection display system, where the width of the Fresnel lens layer is illustrated as a preset length, so the diameter of the circular target area is equal to the width of the Fresnel lens layer. The anti-reflection coating is arranged in the target area (i.e., the dotted area in FIG. 3), and the area other than the target area remains as it is, that is, no anti-reflection coating is arranged in the circular target area.

A particular method for setting the target area will be described below, and further to the target area in FIG. 3, the target area includes N sub-target areas, where the distance of each of the N sub-target areas from the center of the projection screen increments progressively, and the anti-reflection coating in each of the N sub-target areas is such that the transmittivity in the sub-target area is increased by a factor in direct proportion to the distance of the sub-target area from the center of the Fresnel lens layer.

Figure 4:
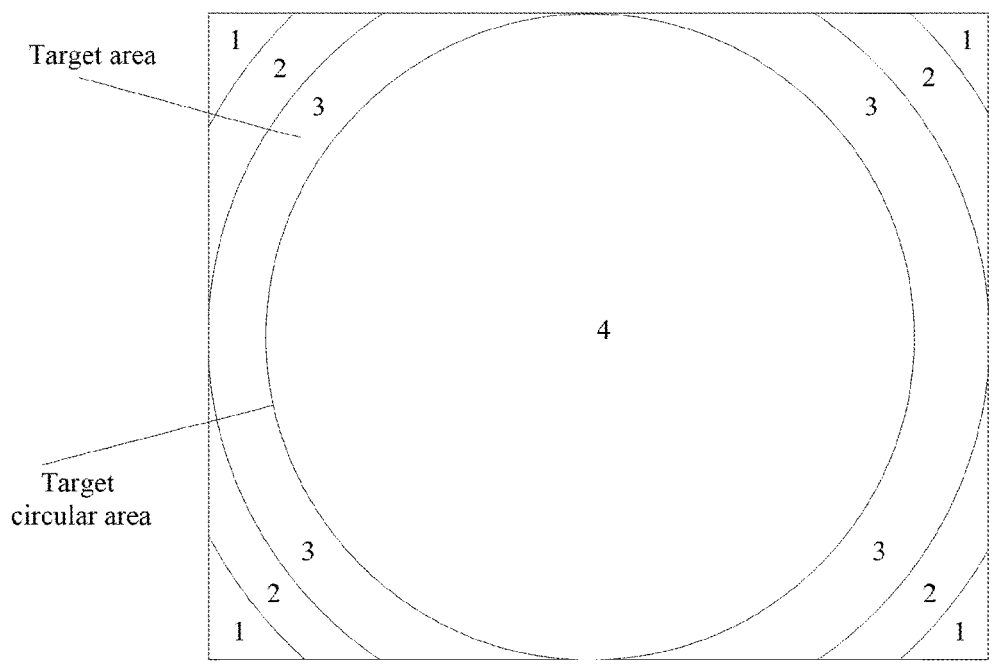
FIG. 4 is a schematic diagram of a target area arranged in a rear projection display system according to some embodiments of this disclosure.

Referring to FIG. 4, there is a schematic diagram of the target area arranged in the rear projection display system according to some embodiments of this disclosure, where the target area will be described with N=3 by way of an example.

The target area is arranged as three sub-target areas 1, 2, and 3 (which are areas in which the anti-reflection coating needs to be arranged), and the area 4 in FIG. 4 is the circular target area (i.e., area other than the target area, in which no anti-reflection coating needs to be arranged); and the anti-reflection coating is arranged in the areas 1, 2, and 3 so that the transmittivity of the projected light beams projected thereon is increased by a reducing factor, that is, the relationship of the transmittivity for the light rays between the respective areas of the anti-reflection coating is 1>2>3. This setting is made because the rear projection screen in the relevant art functions to arrange the energy projected by the projector onto the screen in such a trend that the energy is higher at the center of the rear projection screen, and decrements gradually on the edge thereof, the anti-reflection coating is arranged in some embodiments of this disclosure to thereby maintain this trend while improving the brightness on the edge of the screen, so the anti-reflection coating in the areas 1, 2, and 3 is arranged, and the relationship of the transmittivity for the light rays between the respective areas of the anti-reflection coating is 1>2>3 while the luminance projected by the projector onto the screen is uniform, so that the brightness on the screen can vary consecutively in such a way that it decrements gradually from the center to the edge thereof, while improving the uniformity of brightness throughout the screen, where the brightness will not change sharply, which would otherwise degrade the effect of watching; and of course, if there are a larger number of sub-target areas into which the area where the anti-reflection coating is arranged is divided, then the brightness will be made more consecutive, but if there are too many sub-target areas, then the cost and the process complexity will be increased, so the number of sub-target areas is preferably 7 for the rear projection screen of less than 100 inches.

Moreover the relationship of the transmittivity between the sub-target areas 1, 2, and 3 of the anti-reflection coating arranged therein can also be adjusted as needed in reality, for example, in order to make the brightness in the area 1 equal to that in the area 3, the transmittivity of the anti-reflection coating in the area 1 is set bigger than that of the anti-reflection coating in the area 3, so that the brightness throughout the projection screen can be made more uniform, that is, the brightness is kept consistent throughout the projection screen, or the transmittivity can be adjusted so that the brightness of imaging from the center to the edge decrements gradually from the center to the edge, but the brightness decrements by a factor below a preset threshold.

The transmittivity for the light rays through the anti-reflection coating in the respective sub-target areas can particularly be set as needed in reality, but the embodiments of this disclosure will not be limited thereto.

For the setting of the sub-target areas, since the structure of the Fresnel lens layer of the rear projection screen is symmetric about the center thereof, the brightness is generally distributed on the screen in such a way that it decrements symmetrically from the center of the screen to the edge thereof, so in order to better improve the uniformity of the brightness while maintaining the brightness in the decremented distribution, the sub-target areas are still circular with their radiuses incrementing in an equidistant pattern. For example, for the 70-inch rear projection screen with an aspect ratio of 16:9 in the embodiment above, the length of the rear projection screen is 1550 mm, and the width thereof is 872 mm, and in an implementation, the area 3 can be located in a circular-ring area with a diameter of 872 mm to 1174 mm, the area 2 can be located in a circular-ring area with a diameter of 1174 mm to 1476 mm, and the area 1 can be located in a circular-ring area with a diameter of 1476 mm to 1778 mm, where the three circular-ring areas are arranged equidistantly, and the width of each circular-ring area is 302 mm. Of course, since the rear projection screen is rectangular, some of the circular-ring areas will be truncated by the outline of the rectangular screen into annular sector areas, as illustrated in FIG. 4.

As in some embodiments of this disclosure, there is also a hardened layer in the light incident side of the Fresnel lens layer, the antireflection coating is setting on the incident surface of the hardened layer like the above description.

II. The projection screen is a front projection screen.

Figure 5:
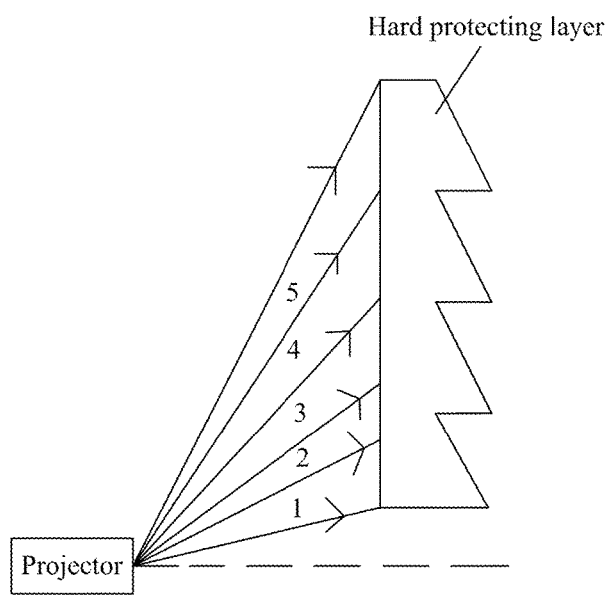
FIG. 5 is a schematic diagram of a front projection display system according to some embodiments of this disclosure.

As illustrated in FIG. 5, there is a projection display system according to some embodiments of this disclosure, where a projection screen is a front projection screen, and the incidence-light side surface of the projection screen is a hard protecting layer, that is, projected light of a projector is firstly projected onto the hard protecting layer of the front projection screen, so an anti-reflection coating is arranged on the hard protecting layer.

Taking a desktop front projection display system as an example, referring to FIG. 5, the central axis of a projector is lower than the central axis of a projection screen. If in the relevant art, the brightness on a front-projection screen becomes darker gradually from the bottom to the top. But in some embodiments of this disclosure the incidence angle of the projected light beams on the entire projection screen is above an angle threshold.

Thus in this case, since the hard protecting layer is rectangular, a target area on the hard protecting layer in some embodiments of this disclosure is divided into N sub-target areas, where the distances of the N sub-target areas from a target position increment progressively along the direction of the target position to the center of the hard protecting layer, and the target position is a position where the plane in which the light incidence side surface of the hard protecting layer lies intersects with the horizontal optical axis of the projector. Here the horizontal optical axis of the projector is an optical axis of a group of optical lenses for imaging in the horizontally arranged projector. Each of the N sub-target areas is an area where a first target area corresponding to the sub-target area intersects with the target area, where the first target area is a circular area with a center being the target position, and a radius being the radius corresponding to the target area, from which a second target area corresponding to the sub-target area is removed, and the second target area includes all of such sub-target areas among the N sub-target areas that their distances from the target position are less than the distance of the sub-target area from the target position.

That is, each of the N sub-target areas is an area where a first target area corresponding to the sub-target area intersects with the target area, where the first target area is an annular area with a center being the target position, and preset radius.

Optionally the anti-reflection coating in each of the N sub-target areas is such that the transmittivity in the sub-target area is increased by a factor in direct proportion to the distance of the sub-target area from the target position.

Figure 6:
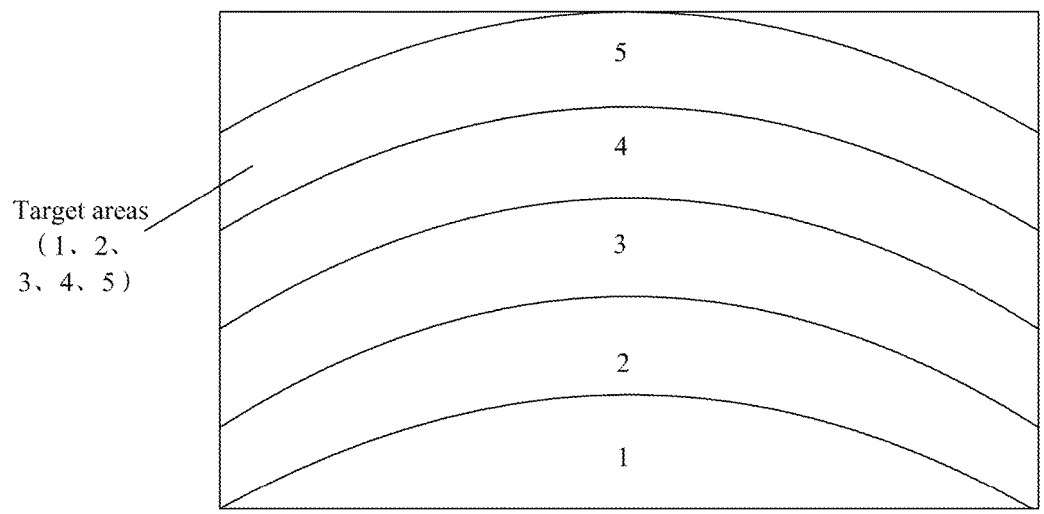
FIG. 6 is a schematic diagram of a target area arranged in a front projection display system according to some embodiments of this disclosure.

Referring to FIG. 6, there is a schematic diagram of a target area arranged in a front projection display system according to some embodiments of this disclosure, where the target area is divided into five sub-target areas, for example, and where:

A. Each of the sub-target areas is a circular-ring area with a center being the target position (i.e., the position where the plane where a front projection screen lies intersects with the horizontal optical axis of a projector).

B. The radiuses of the respective sub-target areas (i.e., five sub-target areas) satisfy such a relationship that is: 5>4>3>2>1.

C. An anti-reflection coating arranged in the respective areas has substantially the same transmittivity for light rays incident at the same angle, where the transmittivity increments gradually from the areas 1 to 5, the transmittivity differs across the areas by a factor of no more than 2%, and the transmittivity in the area 1 differs from that in the area 5 by no more than 3%.

Here the transmittivity increments gradually from the areas 1 to 5, and the values of the transmittivity in the respective areas are controlled so that the brightness on the screen can decrement gradually from the area 1 to the area 5 while improving the brightness throughout the screen.

In some embodiments of this disclosure, in the antireflection coating arranged in the respective areas, he transmittivity increments gradually from the areas 1 to 5.

It shall be noted that since the projection ratio of the projector, the size of the front projection screen, the offset of the projector, etc., are varying in reality, thus resulting in varying light reflection and brightness uniformity conditions, the target area to be designed and optimized, and the sub-target areas in the target area need to be recalculated, that is, the size of the area where the anti-reflection coating is arranged needs to be recalculated without departing the principle of this disclosure.

The light reflection condition on the front projection screen depends upon all of the size of the screen, the projection ratio of the projector, and the offset of the projector, where generally if the size of the screen is larger, the projection ratio of the projector is lower, and the offset of the projector is larger, then there will be more serious light reflection on the screen; and in a real application, the anti-reflection coating needs to be arranged given the projection ratio of less than 0.3, the size of the screen of no more than 120 inches, and the offset of the projector of more than 120%.

By way of an example, light is projected by an ultra-short-focus projector with a projection ratio of 0.24, and an offset of 145% onto a 100-inch front projection screen with an aspect ratio of 16:9, where the length of the front-projection screen is 2214 mm, and the width thereof is 1245 mm; and a real test was made showing a loss of energy approximately ranging 5% to 12% due to reflection on the surface of the screen given the angle ranging from 28° to 71° of the light emitted by the projector, and in order to enhance the effect of increasing the transmittivity while improving the uniformity of the brightness on the screen, the target area can be arranged as follows:

Referring to FIG. 6, the sub-target area 1 is arranged as a circular-ring area with a radius of 280 mm to 529 mm, the sub-target area 2 is arranged as a circular-ring area with a radius of 529 mm to 778 mm, the sub-target area 3 is arranged as a circular-ring area with a radius of 778 mm to 1027 mm, the sub-target area 4 is arranged as a circular-ring area with a radius of 1027 mm to 1276 mm, and the sub-target area 5 is arranged as a circular-ring area with a radius of 1276 mm to 1525 mm, where the width of each of the circular-ring areas is 249 mm; and the target position is located at a position 280 mm immediately below the front projection screen. The incidence angles of the projected light beams in the respective areas are calculated as: 28° to 45° in the area 1; 45° to 56° in the area 2; 56° to 63° in the area 3; 63° to 67° in the area 4; and 67° to 71° in the area 5.

In another aspect, some embodiments of this disclosure further provide a projection display system including the projection screen according to any one of the embodiments above, and a projector which is configured to emit projected light beams to the projection screen.

The projection display system can improve the uniformity of the brightness on the projection screen, where reference can be made to the embodiments above for a particular structure of the projection screen, so a repeated description thereof will be omitted here.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A projection display system, comprising: a rear projection screen having a light incidence side surface including a target area, the light incidence side surface including a Fresnel lens layer, the target area including an area on the Fresnel lens layer other than a circular target area, and the circular target area including a circular area having a center in the center of the rear projection screen and a diameter having a preset length; a projector, the projector configured to emit projected light beams; and an anti-reflection coating arranged in the target area on the light incidence side surface of the rear projection screen to increase transmissivity of the projected light beams in the target area.

2. The projection display system according to claim 1, wherein the target area is divided into N sub-target areas in which the anti-reflection coating is arranged so that the transmissivity is increased by a varying factor in the respective sub-target areas, and N is a positive integer.

3. The projection display system of claim 2, wherein a distance of each of the N sub-target areas from the center of the projection screen increments progressively, and the anti-reflection coating in each of the N sub-target areas is such that the transmissivity in the sub-target area is increased by a factor in direct proportion to the distance of the sub-target area from the center of the Fresnel lens layer.

4. The projection display system according to claim 1, wherein an areal size of the target area is in inverse proportion to a projection ratio or the projector, and an areal size of the circular target area is in direct proportion to the projection ratio of the projector.

5. A projection display system, comprising: a projection screen having a light incidence side surface including a target area; a projector, the projector configured to emit projected light beams; and an anti-reflection coating arranged in the target area on the light incidence side surface of the projection screen to increase transmissivity of the projected light beams in the target area, wherein the projection screen is a front projection screen, the light incidence side surface of the projection screen is a hard protection layer, the target area is divided into N sub-target areas, distances of the N sub-target areas from a target position increment progressively along a direction of the target position to a center of the hard protection layer, the target position is a position where a plane in which a light incidence side surface of the hard protection layer lies intersects with an horizontal optical axis of the projector, and N is a positive integer.

6. The projection display system according to claim 5, wherein each of the N sub-target areas is an area where a first target area corresponding to said sub-target area intersects with the target area, the first target area is a circular area having a center at the target position and a radius corresponding to the target area, from which a second target area corresponding to said sub-target area is removed, and the second target area comprises all of the sub-target areas among the N sub-target areas having distances from the target position of less than the distance of said sub-target area from the target position.

7. A projection screen comprising: a light incidence side surface having a target area; and an anti-reflection coating arranged in the target area on the light incidence side surface of the projection screen to increase transmissivity of projected light beams in the target area; wherein the projected light beams are emitted by a projector and the transmissivity in the target area increases with an increase of an incidence angle of the projected light beams on the projection screen.

8. A rear projection screen comprising: a light incidence side surface having a target area; and an anti-reflection coating arranged in the target area on the light incidence side surface of the rear projection screen to increase transmissivity of projected light beams in the target area, wherein: the projected light beams are emitted by a projector; the light incidence side surface includes another area different than the target area; and an incidence angle of the projected light beams on the target area is greater than an incidence angle of the projected light beams on the other area different than the target area.

9. A projection screen, comprising: a light incidence side surface having a target area; and an anti-reflection coating arranged in the target area on the light incidence side surface of the projection screen to increase transmissivity of projected light beams in the target area, wherein the projected light beams are emitted by a projector; wherein the projection screen is a rear projection screen, the light incidence side surface of the projection screen is a Fresnel lens layer, the target area is an area on the Fresnel lens layer other than a circular target area, and the circular target area is a circular area having a center at the center of the projection screen and a diameter having a preset length.

10. The projection screen according to claim 9, wherein the target area is divided into N sub-target areas in which the anti-reflection coating is arranged so that the transmissivity is increased by a varying factor in the respective sub-target areas, and N is a positive integer.

11. The projection screen according to claim 10, wherein a distance of each of the N sub-target areas from the center of the rear projection screen increments progressively, and the anti-reflection coating in each of the N sub-target areas is such that the transmittivity in the sub-target area is increased by a factor in direct proportion to the distance of the sub-target area from the center of the Fresnel lens layer.

12. The projection screen according to claim 9, wherein an areal size of the target area is in inverse proportion to a projection ratio of the projector, and an areal size of the circular target area is in direct proportion to the projection ratio of the projector.

13. A projection screen, comprising: a light incidence side surface having a target area; and an anti-reflection coating arranged in the target area on the light incidence side surface of the projection screen to increase transmissivity of projected light beams in the target area, wherein the projected light beams are emitted by a projector; wherein the projection screen is a front projection screen, the light incidence side surface of the projection screen is a hard protection layer, the target area is divided into N sub-target areas, distances of the N sub-target areas from a target position increment progressively along a direction of the target position to a center of the hard protection layer, and the target position is a position where a plane in which a light incidence side surface of the hard protection layer lies intersects with a horizontal optical axis of the projector.

14. The projection screen according to claim 13, wherein each of the N sub-target areas is an area where a first target area corresponding to said sub-target area intersects with the target area, the first target area is a circular area having a center at the target position and a radius corresponding to the target area, from which a second target area corresponding to said sub-target area is removed, and the second target area comprises all of the sub-target areas among the N sub-target areas having distances from the target position of less than the distance of said sub-target area from the target position.

15. The projection screen according to claim 13, wherein the anti-reflection coating n each of the N sub-target areas s arranged such that the transmissivity in the sub-target area is increased by a factor in direct proportion to the distance of the sub-target area from the target position.

* * * * *